US011353630B2

(12) United States Patent
Kester et al.

(10) Patent No.: US 11,353,630 B2
(45) Date of Patent: Jun. 7, 2022

(54) METHOD FOR TREATING A LENS TO REDUCE LIGHT REFLECTIONS FOR ANIMALS AND DEVICES THAT VIEW THROUGH THE ULTRA VIOLET LIGHT SPECTRUM

(71) Applicant: Quantum Innovations, Inc., Central Point, OR (US)

(72) Inventors: Norman L. Kester, Rogue River, OR (US); Adam E. Winkelman, Foley, MN (US); Nicholas M. Hall, Ashland, OR (US); Richard D. Unbankes, Medford, OR (US)

(73) Assignee: QUANTUM INNOVATIONS, INC., Central Point, OR (US)

( * ) Notice: Subject to any disclaimer, the term of this patent is extended or adjusted under 35 U.S.C. 154(b) by 289 days.

(21) Appl. No.: 16/782,921

(22) Filed: Feb. 5, 2020

(65) Prior Publication Data

US 2020/0301045 A1    Sep. 24, 2020

Related U.S. Application Data

(60) Provisional application No. 62/819,891, filed on Mar. 18, 2019.

(51) Int. Cl.
*G02B 1/115* (2015.01)
*G02B 1/18* (2015.01)
(Continued)

(52) U.S. Cl.
CPC ............... *G02B 1/115* (2013.01); *G02B 1/18* (2015.01); *G02B 5/208* (2013.01); *G02B 5/223* (2013.01);
(Continued)

(58) Field of Classification Search
CPC .. F41G 1/14; G02B 1/115; G02B 1/18; G02B 5/208; G02B 5/223; G02B 5/283
See application file for complete search history.

(56) References Cited

U.S. PATENT DOCUMENTS 2,391,595 A    12/1945  Richards et al.
4,632,527 A    12/1986  Masso et al.
(Continued)

FOREIGN PATENT DOCUMENTS

WO    WO2015009349    1/2015

*Primary Examiner* — Ryan S Dunning
(74) *Attorney, Agent, or Firm* — Jerry Haynes Law

(57) ABSTRACT

An anti-reflective lens and method for treating a lens to reduce visible light and ultraviolet light at levels perceptible to the vision system of an animal and a detection device having tetra-chromatic vision or di-chromatic vision. The treatment method produces an optical substrate that is less perceptible to an animal and detection device perceptible to view through the UV light spectrum. The method provides a substrate treated on opposite sides with an anti-reflective coating so that reflections from visible light and UV light are not visible to the animal and detection device, from incident angles between 0° to 60°. The anti-reflective coatings are applied in varying amounts of constituents and thicknesses, consisting of: adhesion layer, low index material ($SiO_2$), high index material ($ZrO_2$), and superhydrophobic layers. The substrate is initially UV treated, and then coated with the anti-reflective coating to minimize visible light and UV light reflection between 300-400 nanometers.

16 Claims, 4 Drawing Sheets

(51) Int. Cl.
  *G02B 5/20*   (2006.01)
  *G02B 5/22*   (2006.01)
  *F41G 1/027*  (2006.01)
  *F41G 1/14*   (2006.01)
  *G02B 5/28*   (2006.01)

(52) U.S. Cl.
  CPC ............... *F41G 1/027* (2013.01); *F41G 1/14* (2013.01); *G02B 5/283* (2013.01)

(56) References Cited

U.S. PATENT DOCUMENTS

| | | |
|---|---|---|
| 5,409,760 A | 4/1995 | Neitz et al. |
| 5,541,735 A | 7/1996 | Rengle |
| 6,906,862 B2 | 6/2005 | Cross |
| 7,873,213 B2 | 1/2011 | Speigle et al. |
| 8,358,467 B2 | 1/2013 | Yan et al. |
| 8,557,877 B2 | 10/2013 | Mukhupadhyay et al. |
| 2002/0024705 A1 | 2/2002 | Nakano |
| 2002/0039236 A1 | 4/2002 | Jones |
| 2003/0094714 A1 | 5/2003 | Buzzza et al. |
| 2005/143812 A1 | 6/2005 | Paul et al. |
| 2010/0033819 A1 | 2/2010 | Schulz et al. |
| 2011/0019282 A1 | 1/2011 | Lusinchi et al. |
| 2012/0019915 A1 | 1/2012 | Yan et al. |
| 2012/0081792 A1 | 4/2012 | Neuffer |
| 2014/0374377 A1 | 12/2014 | Schultz et al. |
| 2015/0083193 A1 | 2/2015 | Ueda |
| 2015/0131047 A1 | 5/2015 | Saylor et al. |
| 2016/0003982 A1 | 1/2016 | Avetisian et al. |
| 2020/0283335 A1* | 9/2020 | Wu ....................... C03C 23/002 |

\* cited by examiner

METHOD FOR TREATING A LENS TO REDUCE LIGHT REFLECTIONS FOR ANIMALS AND DEVICES THAT VIEW THROUGH THE ULTRA VIOLET LIGHT SPECTRUM

CROSS-REFERENCE TO RELATED APPLICATIONS

This application claims the benefits of U.S. provisional application No. 62/819,891, filed Mar. 18, 2019 and entitled OPTICAL LENS AND METHOD FOR TREATING A LENS TO REDUCE LIGHT REFLECTIONS FOR LENSES, DETECTION DEVICES, AND ANIMALS THAT VIEW THROUGH ULTRA VIOLET LIGHT SPECTRUM, which provisional application is incorporated by reference herein in its entirety.

FIELD OF THE INVENTION

The present invention relates generally to an anti-reflective lens and method for treating a lens to reduce visible and ultra violet light reflections for animals and detection devices that view through the ultra violet light spectrum. More so, the present invention relates to a substrate that is UV treated, and subsequently coated with an anti-reflective coating to minimize visible light and UV light at an incident angle from 0° to 60° relative to the animal having tetra-chromatic and di-chromatic vision that can see in UV light spectrum; whereby the anti-reflective coating is applied in multiple coats, comprising: an adhesion layer, a low index material, a high index material, and a superhydrophobic layer in varying amounts of constituents and nanometer thicknesses.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, ultra violet light falls in the range of the EM spectrum between visible light and X-rays, having frequencies of about $8 \times 10^{14}$ to $3 \times 10^{16}$ cycles per second, or hertz (Hz), and wavelengths of about 380 nanometers ($1.5 \times 10^{-5}$ inches) to about 10 nm ($4 \times 10^{-7}$ inches). It is known in the art that optical lenses and viewing surfaces reflect varying amounts of visible light and ultra violet light across the ultraviolet light range. Thus, when optical lenses and viewing surfaces are treated, in order to create visual effects or increased light transmission or sensitivity, this is generally in a spectral range and does not account for all of the wavelengths of light that tetrachromacy and dichromacy allow.

Generally, humans see a wide range of color as a result of three types of cones in our eyes: one that's sensitive to short-wavelength light in the blue portion of the color spectrum, one sensitive to middle-wavelength light in the green portion and a third type receptive to long-wavelength light in the red portion. In contrast to humans' "trichromatic" vision, birds, ducks, amphibians, and other tetra-chromatic organisms have "tetra-chromatic" vision. This is because birds have much different eyes and vision systems than humans. They see color more intensely and vibrantly as well as having the ability to see into the UV range.

For example, deer have "dichromatic" vision because they have only two types of cones, lacking the cone that's sensitive to longer wavelengths such as red and orange. This does not mean deer don't see red and orange hues, only that deer perceives the colors differently, likely the same way as a color-blind person. Thus, the hoofed ruminant mammals see color more intensely and vibrantly as well as having the ability to see into the UV range. The human eye does not perceive the UV wavelengths of light.

Generally, tetrachromacy is the condition of possessing four independent channels for conveying color information, or possessing four types of cone cells in the eye. Organisms with tetrachromacy vision are called tetrachromats. In tetrachromatic organisms, the sensory color space is four-dimensional, meaning that to match the sensory effect of arbitrarily chosen spectra of light within their visible spectrum requires mixtures of at least four primary colors. It is also known that animals with dichromatic vision have two receptor types—light-sensitive cells in the retina of the eye used in color vision. This gives such animals limited color vision, with the ability to see only one or two colors, such as blue and yellow. Conversely, animals such as humans and apes are trichromatic. Meaning they see three colors.

Typically, the human eye does not perceive the UV wavelengths of light. Current anti-reflective lenses and viewing surfaces reflect varying amounts of light. When anti-reflective lenses and viewing surfaces are treated in order to create visual effects or increased light transmission or sensitivity, this is generally in a spectral range and does not account for all of the wavelengths of light that tetrachromacy allows.

Other proposals have involved viewing lenses used for discretely viewing game animals. The problem with these lenses is that they do not utilize a UV treated substrate, and then subsequently coat the substrate with an anti-reflective coating consisting of: an adhesion layer, a low index material, a high index material, and a superhydrophobic layer in varying amounts of constituents and nanometer thicknesses. Even though the above cited viewing lenses used for discretely viewing game animals meet some of the needs of the market, an anti-reflective lens and method for treating a lens to reduce visible and ultra violet light reflections for animals and detection devices that view through the ultra violet light spectrum, is still desired.

SUMMARY

Illustrative embodiments of the disclosure are generally directed to an anti-reflective lens and method for treating a lens to reduce visible light and ultra violet light across the ultraviolet light range for animals and devices that view through the ultra violet light spectrum.

The anti-reflective lens is a general viewing lens that has anti-reflective properties. The anti-reflective lens comprises a substrate that is UV treated, or has integrated therein, an invisible dye used for absorbing a substantial portion of the UV spectrum. The substrate is treated on opposite sides with an anti-reflective coating, which enables the substrate to minimize light reflections, and especially visible light or ultraviolet light at levels perceptible to the vision system of an animal having tetra-chromatic and di-chromatic vision, and a detection device with a viewing system in the ultra violet light spectrum. The animal may include tetra-chromatic and di-chromatic organisms that can see in UV spectrum of light, such as a game bird or a deer. The detection device may include a motion detector that senses UV light.

The treated substrate helps block UV light passing therethrough. The anti-reflective lens prevents visible light and UV light from reflecting off the substrate at an incident angle from 0° to 60° when viewed by the animal and detection device. The reduction of light reflection/glare from this incident angle at the 0° to 60° range is ideal for reducing light glare from the lens, even when the animal (or detection device) is positioned towards, away from, directly over, and in moving directions in relation to the anti-reflective lens.

The anti-reflective lens is treated by applying an anti-reflective coating in multiple coats. The anti-reflective coating includes of the following constituents: an adhesion layer, a low index material comprising $SiO_2$, a high index material comprising $ZrO_2$, and a superhydrophobic layer. Each ingredient is applied in subsequent layers of varying nanometer thicknesses. In this manner, the treated anti-reflective lens exhibits minimal reflection properties in the visible range of the electromagnetic spectrum and almost no reflection in the UV range between 300-400 nanometers. This reduces the probability of the exposing UV light being reflected off the anti-reflective lens.

In one embodiment, the method for treating a lens to reduce light reflections for animals and devices that view through the ultra violet light spectrum, comprises:
  providing a substrate, the substrate being defined by a front surface, a rear surface, and a circumferential edge;
  integrating an invisible dye into the substrate, the dye absorbing at least 97 percent of ultra violet light in the ultra violet light range;
  cleaning the surfaces of the substrate;
  etching the surfaces of the substrate;
  applying a primer solution to the surfaces of the substrate;
  applying an anti-reflective coating to the surfaces of the substrate, the anti-reflective coating including at least one of the following: an adhesion layer, a low index material, a high index material, and a superhydrophobic layer, the anti-reflective coating being applied in the following sequence:
    applying the adhesion layer;
    applying about 164.53 nm of the low index material;
    applying about 14.16 nm of the high index material;
    applying about 23.5 nm of the low index material;
    applying about 101 nm of the high index material;
    applying about 76.19 nm of the low index material;
    applying the superhydrophobic layer;
  if the anti-reflective coating is applied to one surface, flipping the UV treated substrate and coating the opposite surface in the same manner;
  integrating the UV treated substrate into a device or substrate; and
  inhibiting glare and reflections for an animal having tetra-chromatic vision or di-chromatic vision.

In another aspect, the substrate includes at least one of the following: a trivex lens, a polycarbonate lens, a UV treated Cr-39 lens, and a UV treated glass lens.

In another aspect, the application of the anti-reflective coating comprises a vacuum coating.

In another aspect, the vacuum coating comprises an electron beam gun evaporation technique or a magnetron sputtering technique.

In another aspect, the low index material comprises $SiO_2$.

In another aspect, the high index material comprises $ZrO_2$.

In another aspect, the method further comprises dipping the substrate into a primer solution if the UV treated substrate is not hard-coated.

In another aspect, the method further comprises spinning the primer solution onto the UV treated substrate, if the UV treated substrate is not hard-coated.

In another aspect, the method further comprises etching, with an ultrasonic etching device, the surfaces of the substrate.

In another aspect, the method further comprises curing the UV treated substrate in an oven, if the UV treated substrate is not hard-coated.

In another aspect, the method further comprises applying the anti-reflective coating to the surfaces in multiple coats.

In another aspect, the method further comprises plasma etching the surfaces of the substrate.

In one aspect, an anti-reflective substrate for treating a substrate to reduce the light wavelengths to make the anti-reflective substrate less perceptible to mammals with tetra-chromatic vision, comprises: a UV treated substrate comprising a substrate element having a first surface and a second surface, the surfaces being defined by UV absorbing properties; the first surface of the UV treated substrate comprising an anti-reflective coating configured to minimize reflection of light in the UV range between 300-400 nanometers; the second surface of the UV treated substrate comprising an anti-reflective coating configured to minimize reflection of light in the UV range between 300-400 nanometers; whereby the internal absorption of the substrate absorbs 97%+ of the UV in all ranges.

One objective of the present invention is to minimize light reflections and glare from an anti-reflective lens for animal having tetra-chromatic vision or di-chromatic vision.

Another objective is to minimize light reflections and glare from an anti-reflective lens for a detection device, such as a UV-sensing motion detector.

Another objective is to reduce the wavelengths of light reflected, such that any and all lenses, detection devices, and animals that view through the UV spectrum cannot see the light reflections from the lens.

Yet another objective is to produce an anti-reflective lens that has the appearance of little to no reflection in the visible range of the electromagnetic spectrum.

Yet another objective is to help better conceal hunters in hunting animals with tetra-chromatic vision or di-chromatic vision.

Yet another objective is to provide an inexpensive to manufacture UV blocking, anti-reflection lens.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
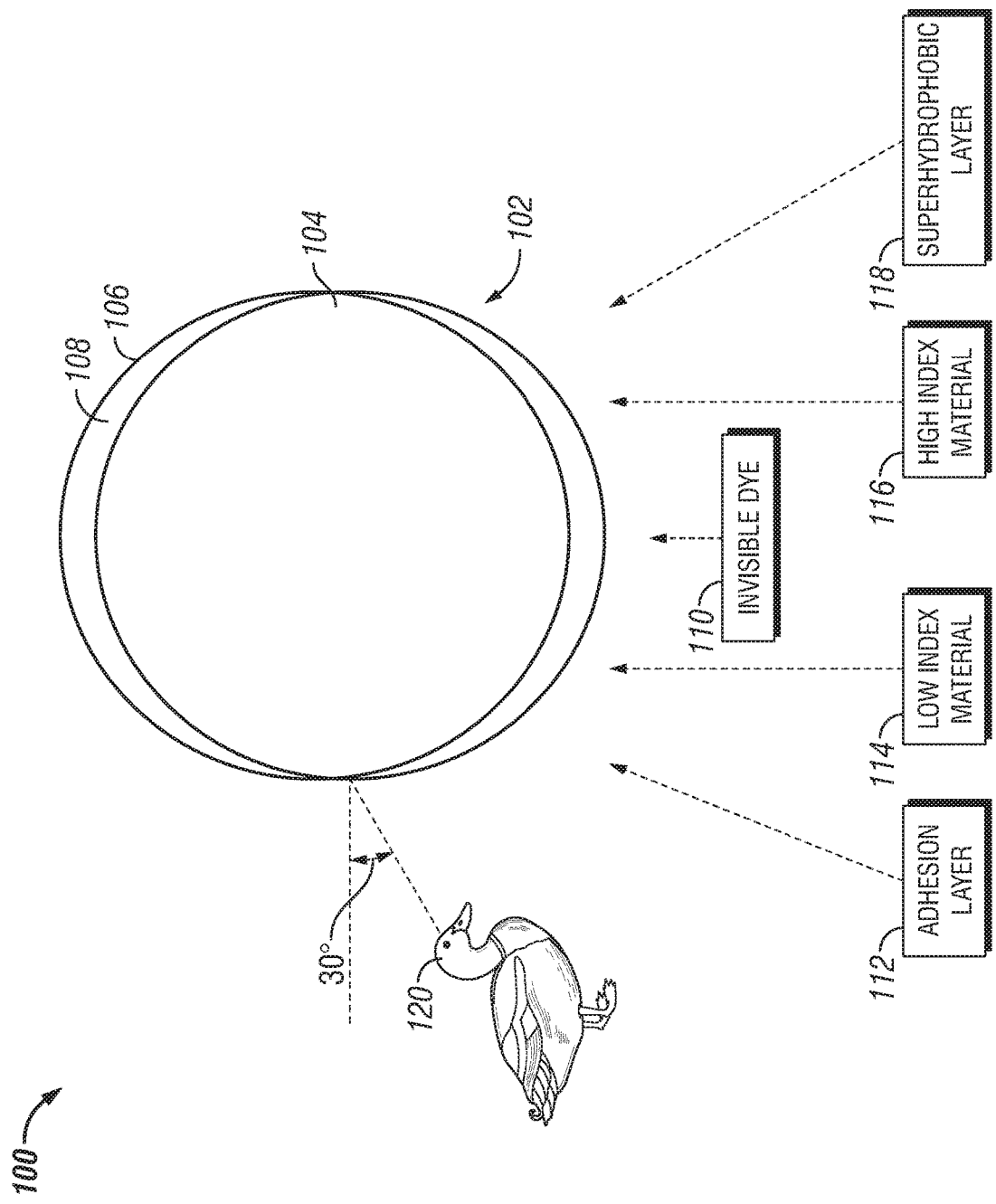
FIG. 1 shows an exemplary anti-reflective lens, showing a substrate coated with an anti-reflective coating, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An anti-reflective lens 100 and method 200 for treating a lens to reduce light reflections for animals and devices that view through the ultra violet light spectrum is referenced in FIGS. 1-7. The anti-reflective lens 100 comprises a substrate 102 that is initially UV treated, and then coated with the anti-reflective coating to minimize visible light and UV light reflection between 300-400 nanometers. The substrate 102 is uniquely designed to be fitted into a device, such as a lens sight, a rifle sight, glasses, or in any viewing device in which it is advantageous to minimize visible light and ultraviolet light at levels perceptible to the vision system of an animal having tetra-chromatic vision or di-chromatic vision. The anti-reflective lens 100 is also efficacious for reducing light glare and light reflections when viewed from a detection device that detects the ultra violet light spectrum, e.g., a UV motion detector. This creates an optical substrate 102 that reflects almost no light in the visible range of light between 400-700 nanometers, and the ultra violet light range between 300-400 nanometers, so as to make it difficult for animals with tetra-chromatic and di-chromatic vision to detect the anti-reflective lens via light and UV reflections/glare. Further, the anti-reflective lens 100 inhibits light glare and light reflections at an incident angle from 0° to 60° from the point of view of the animal 120 and a detection device. Thus, the light glare is not viewable from the sides, or from an upper or lower vantage point.

Those skilled in the art will recognize that it can be advantageous to avoid detection from animals and detection devices—especially, for hunters and military personnel. For example, the anti-reflective lens 100 minimizes visible and ultra violet light reflections off the substrate 102, as viewed from the vantage point of birds with tetra-chromatic vision, and deer with dichromatic vision. Thus, the anti-reflective lens 100 can be integrated into a gunsight or scope lens used with hunting rifles, where reflections and glare is minimized, from the point of view of the animal and detection device.

The anti-reflective lens 100, when fully treated, has the unique characteristic of minimizing glare at an incident angle between 0° to 60° relative to the animal 120 or detection device. This can be useful, for example, in preventing detection of a hunter by game birds flying directly above the anti-reflective lens 100, or game deer located at a lower elevation from the hunter and anti-reflective lens 100. Thus, it is one objective of the present invention to help better conceal hunters while hunting animals with tetra-chromatic vision or di-chromatic vision that see the ultra violet light spectrum.

It is known in the art that ultra violet light falls in the range of the EM spectrum between visible light and X-rays, having frequencies of about $8 \times 10^{14}$ to $3 \times 10^{16}$ cycles per second, or hertz (Hz), and wavelengths of about 380 nanometers ($1.5 \times 10^{-5}$ inches) to about 10 nm ($4 \times 10^{-7}$ inches). The present invention details optical lens and viewing surface treatments that allow for reductions in all wavelengths of light in order to make it difficult for any and all lenses, detection devices, and animals 120 that view through the ultra violet light spectrum to discover these devices via reflection that are perceptible to an animal 120 that exhibit both tetra-chromatic and dichromatic vision.

As FIG. 1 references, the anti-reflective lens 100 comprises a substrate 102, such as known in the art of both short-range and long-range viewing lenses. In some embodiments, the lens may include, without limitation, a trivex lens, a polycarbonate lens, a UV treated Cr-39 lens, and a UV treated glass lens. The anti-reflective lens 100 comprises a substrate 102, which may be fabricated from glass, polymer, synthetic plastic, or combinations thereof. The substrate 102 may have various shapes and thicknesses that are efficacious for enhancing viewing of an object from a distance. In some embodiments, the substrate 102 is defined by a front surface 104, a rear surface 106, and a circumferential edge 108. The surfaces 104, 106 of the substrate 102 may be flat, concave, or convex. The circumferential edge 108 of the substrate 102 may be of various thicknesses. These characteristics of the substrate 102 may form a generally circular or disc-shaped lens.

It is significant to note that the substrate 102 is initially UV-treated prior to the application of the anti-reflective coating, discussed below. Thus, treating the substrate 102 for UV protection involves integrating an invisible dye 110 into the substrate 102. The dye 110 is configured to allow the substrate 102 to absorb at least 97° of the ultra violet light found in the ultra violet light range. Thus, in some embodiments, the present invention may utilize a pre-fabricated UV-treated substrate, or may treat the substrate 102 with the dye 110, so as to create a UV-treated substrate 102. In either case, the anti-reflective lens 100 is UV-treated to absorb a substantial amount of the ultra violet light striking the front surface 104 of the substrate 102.

The surfaces 104, 106 of the substrate 102 are further cleaned, etched, and coated with a primer prior to coating with the anti-reflective coating. The cleaning may be performed with a cloth or liquid means known in the art of lenses. The surfaces 104, 106 of the substrate 102 may be etched with an ultrasonic etching device. The etching helps prepare the surfaces for receiving the various layers of the anti-reflective composition.

A primer may then be added, if the substrate 102 is not hard-coated. The primer may be added by dipping the substrate 102 into a primer solution. In other embodiments, the primer solution is spun onto the substrate 102; especially if the substrate 102 is not of the hard-coated variety. Additional treatment may include curing the substrate 102 in a curing oven. In one embodiment, the cleaning, etching, and priming treatments are performed prior to application of the anti-reflective coating.

Looking again at FIG. 1, an anti-reflective coating is applied in multiple coats to at least one of the surfaces of the substrate 102. In some embodiments, the anti-reflective coating may also be applied to the circumferential edge 108 of the substrate 102. Various substrate-coating means known in the art may be used to apply the coating, including vacuum coating through an electron beam gun evaporation technique or a magnetron sputtering technique.

In some embodiments, the ingredients/compositions of the anti-reflective coating may include, without limitation: an adhesion layer 112, a low index material 114 comprising $SiO_2$, a high index material 116 comprising $ZrO_2$, and a superhydrophobic layer 118. The layers may be applied to the substrate 102 in the above sequential order. In alternative embodiments, the ingredients of the anti-reflective coating are applied on the surfaces of the substrate 102 in reverse or alternating orders of application.

After receiving the UV-treatment, and the anti-reflective coating, the surfaces of the substrate 102 are operable to minimize reflection/glare in the visible light range and the ultraviolet light range, such as ultra violet light between 300 to 400 nanometers, from the vantage point of the animal 120 or detection device. Additionally, the anti-reflective coating configures the surfaces 104, 106 of the substrate 102 to have an internal absorption of at least 97% of the ultra violet light range between about 300 to 400 nanometers. The substrate 102 may then be fitted into a device, such as a rifle sight, binoculars, or other lens-adaptable device known in the art. The substrate 102 may also be stacked onto additional substrates, both with or without treatment.

Figure 2:
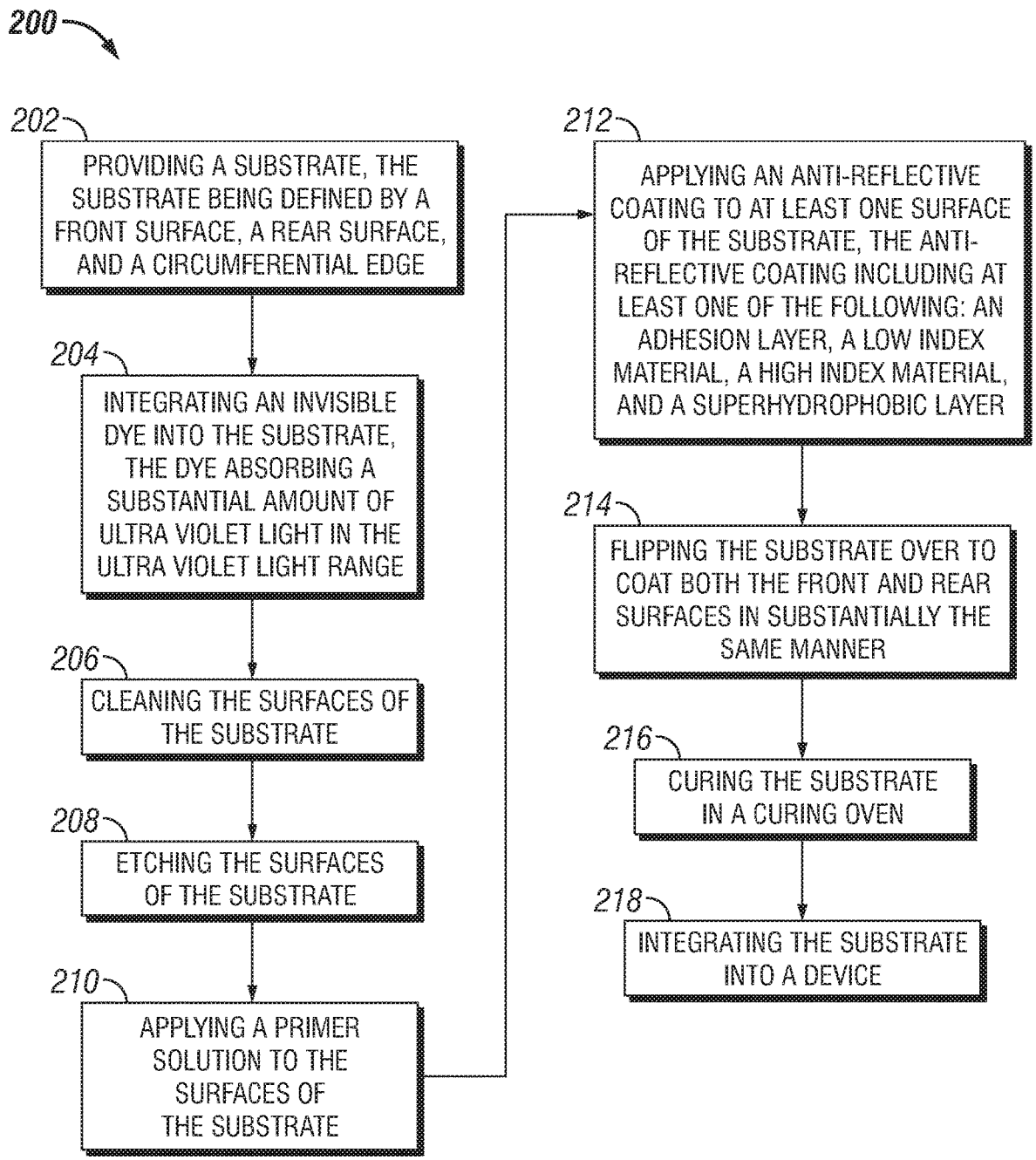
FIG. 2 shows a flowchart of an exemplary method for treating a lens to reduce light wavelengths to make the anti-reflective lens less perceptible to any and all lenses, detection devices, and animals that view through the UV spectrum, in accordance with an embodiment of the present invention.

FIG. 2, references a flowchart of an exemplary method 200 for treating a lens to reduce light reflections for animals and devices that view through the ultra violet light spectrum. The substrate 102 described above is treated, in the following manner. In one embodiment, the method 200 comprises an initial Step 202 of providing a substrate 102, the substrate 102 being defined by a front surface 104, a rear surface, and a circumferential edge 108. The surfaces 104, 106 of the substrate 102 may be flat, concave, or convex. The circumferential edge 108 of the substrate 102 may be of various thicknesses.

The substrate 102 is initially UV-treated to reduce ultra violet light reflections. Thus, the method 200 includes a Step 204 of integrating an invisible dye 110 into the substrate 102, the dye 110 absorbing a substantial amount of ultra violet light in the ultra violet light range. The invisible dye 110 is a known means to UV-treat the substrate 102, such that a substantial amount of ultra violet light is absorbed by the substrate 102. In one non-limiting embodiment, 97% of ultra violet light is blocked/absorbed by the substrate 102 after treatment. In other embodiments, the substrate 102 is pre-manufactured to be UV-treated, or may require application of Step 204 to integrate the dye 110 therein. It is significant to note that UV-treatment works to reduce glare and reflection from the substrate 102.

In some embodiments, a Step 206 includes cleaning the surfaces of the substrate. The substrate 102 may be hand cleaned to remove all debris and contaminants that may create defects in the final anti-reflective lens product. Another Step 208 comprises etching the surfaces of the substrate 102. In one embodiment, the etching of the surfaces is performed with an ultrasonic etching device. A further Step 210 includes applying a primer solution to the surfaces of the substrate. In conditions where the substrate 102 is not hard-coated, a primer solution is applied to the substrate 102 through dipping directly into the primer solution, or spinning the primer solution onto the substrate 102.

In some embodiments, a Step 212 may include applying an anti-reflective coating to at least one surface of the substrate 102, the anti-reflective coating including at least one of the following: an adhesion layer 112, a low index material 114, a high index material 116, and a superhydrophobic layer 118. Each layer applied to the substrate 102 provides unique anti-reflection characteristics to the substrate 102.

For example, the adhesion layer 112 is a substance that helps other layers to adhere to the surfaces of the substrate 102. The low index material 114 comprises a $SiO_2$, and other elements or compounds complimentary to low index functions. The high index material 116 comprises a $ZrO_2$, and other elements or compounds complimentary to high index functions. The superhydrophobic layer 118 inhibits moisture from clouding the substrate 102. In one non-limiting embodiment, a water droplet striking the substrate 102 on the superhydrophobic layer 118 strikes at a contact angle that exceeds 150°. This is known in the art as the "lotus effect".

In one non-limiting embodiment, the anti-reflective coating is applied in the following sequence: applying the adhesion layer 112; applying about 164.52 nm of the low index material 114; applying about 14.16 nm of the high index material 116; applying about 22.5 nm of the low index material 114; applying about 101 nm of the high index material 116; applying about 76.19 nm of the low index material 114; and applying the superhydrophobic layer 118. In other embodiments, different sequences of layers, and different thicknesses of layers can be applied to the surface(s) of the substrate 102. Furthermore, different variations of nanometer thickness, low index material 114, and high index material 116 may also be used.

In the above-mentioned combination of constituents that make up the anti-reflective composition, the substrate 102 creates little to no reflection in the visible range of the electromagnetic spectrum and little to no reflection in the UV range from angles between 0° to 60°. This lack of reflective properties from the point of view of a mammal with tri-chromatic and di-chromatic eyesight as well as detection devices is also at normal angles of incidence as well as off axis angles of incidence up to 60°.

The constituents of the anti-reflective coating can be, however, adjusted to vary the amount of light being reflected or creating glare off the substrate, from the point of view of the animal. The constituents of the anti-reflective coating can also be varied to increase or decrease the angle of incidence of light reflection, which the animal 120 and detection device having a viewing system through the ultra violet light spectrum.

FIGS. 3-7 reference multiple graphs that show the percentage of ultra violet light reflecting off the substrate 102 at different wavelength of the ultraviolet light range, based on the configuration of the anti-reflective coating. The amount of reflection and glare from the substrate 102 varies as a result of the different configurations of layering the anti-reflective coating. Thus, as the quantity of each ingredient is changed, there are different amounts of visible light reflections and glare, from the point of view of the animal or detection device. For example, increasing the amount of high index layer 116 reduces light reflection off the substrate. And increasing the amount of superhydrophobic layer 118 can result in moisture build up on the substrate, which creates more light reflections and glare for the animal.

Figure 3:
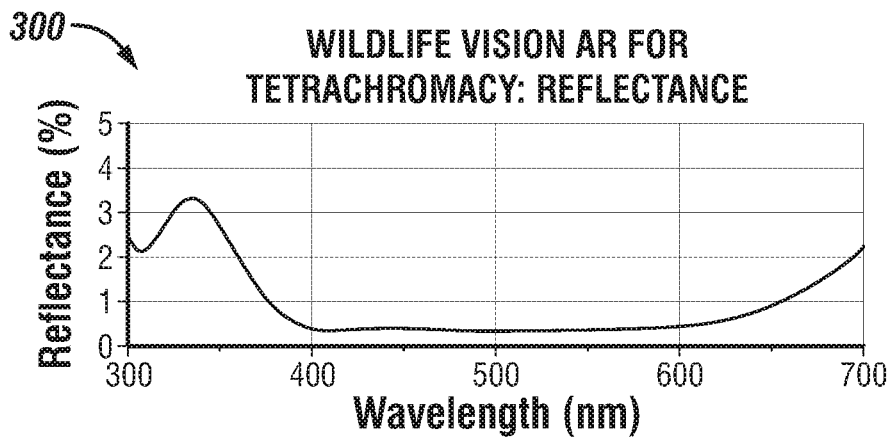
FIG. 3 shows a reflectance graph of an anti-reflective coating that reflects 2.1% in 700 nm range and 3.2% in the 350 nm range at a 0° angle of incidence, in accordance with an embodiment of the present invention.
Figure 4:
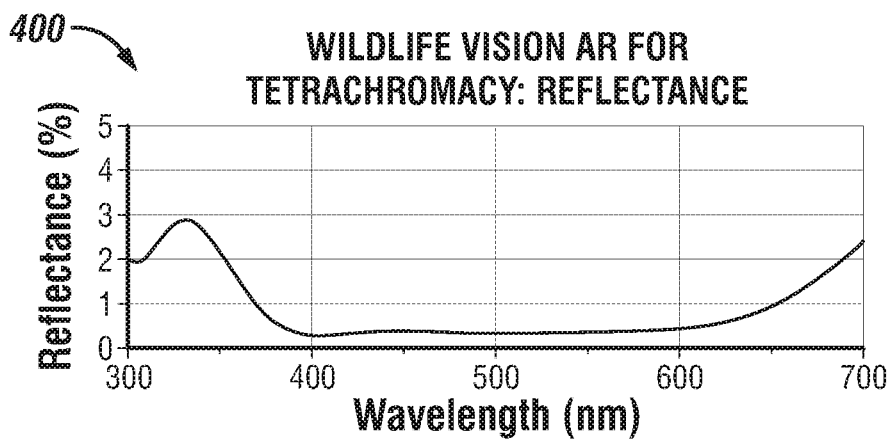
FIG. 4 shows a reflectance graph of an anti-reflective coating that reflects 2% in the 700 nm range and 2.9% in the 340 nm range at a 15° angle of incidence, in accordance with an embodiment of the present invention.

FIG. 3 shows a reflectance graph 300 in which the surfaces 104, 106 of the substrate 102 are coated with a first embodiment of the anti-reflective coating that is designed to reflect minimal amount of light between 400-700 nm, or the ultra violet light range between 300-400 nm. In this example, the same anti-reflective coating reflects 2.1% in 700 nm range and 3.2% in the 350 nm range and 0° of incidence. In another embodiment, FIG. 4 shows a reflectance graph 400 in which the surfaces 104, 106 of the substrate 102 are coated with a second embodiment of the anti-reflective coating. In this configuration, the same anti-reflective coating reflects 2% in the 700 nm range and 2.9% in the 340 nm range at 15° angle of incidence.

Figure 5:
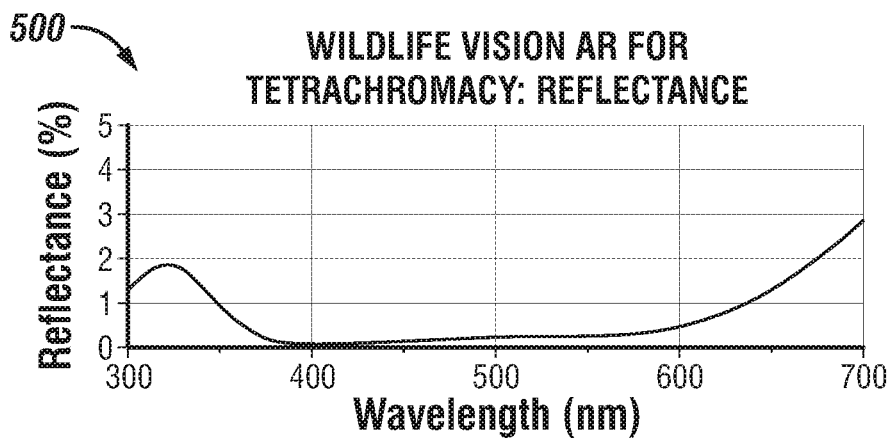
FIG. 5, a reflectance graph of an anti-reflective coating that reflects 2.8% in the 700 nm range and 1.9% in the 325 nm range at a 30° angle of incidence, in accordance with an embodiment of the present invention.
Figure 6:
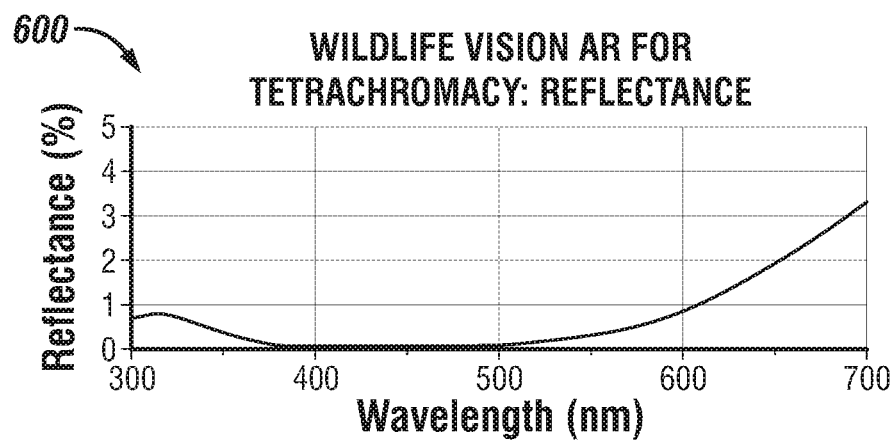
FIG. 6, a reflectance graph of an anti-reflective coating that reflects 3.2% at 700 nm's and 1.8% at 310 nm range at a 45° angle of incidence, in accordance with an embodiment of the present invention.
Figure 7:
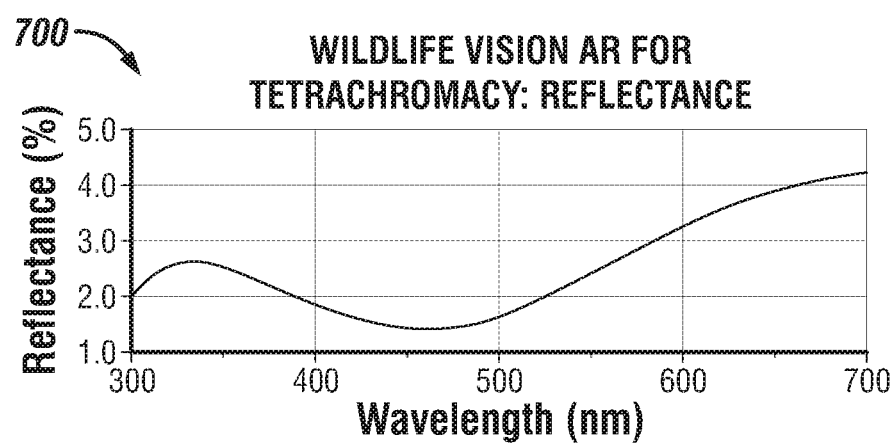
FIG. 7, a reflectance graph of an anti-reflective coating that reflects 4.2% at the 700 nm range and 2.6% at 240 nm range at 60° angle of incidence, in accordance with an embodiment of the present invention.

Looking now at a reflectance graph 500 in FIG. 5, the same anti-reflective coating as shown in FIG. 4 reflects 2.8% in the 700 nm range and 1.9% in the 325 nm range at 30° angle of incidence. Yet another reflectance graph 600 shown in FIG. 6 references the ultra violet light reflectance when the angle of incidence is at 45°. This 45° angle of incidence is used in the same anti-reflective coating reflecting 3.2% at 700 nm and 1.8% at 310 nm range at the 45° angle of incidence. In yet another example of a reflectance graph 700 shown in FIG. 7, the same anti-reflective coating reflects 4.2% at the 700 nm range and 2.6% at 240 nm range at 60° angle of incidence.

Because the substrate 102 is coated with multiple layers, and in multiple passes to achieve the desired anti-reflective properties for at least one surface 104, 106, a Step 214 may require flipping the substrate 102 over to coat both the front and rear surfaces 104, 106 in substantially the same manner. Flipping the substrate 102 may be performed through automated means, such as robotic manipulation, or simply manual flipping the substrate 102. After coating, a Step 216 involves curing the substrate 102 in a curing oven, or through other lens drying means known in the art. The curing Step 216 is especially useful when the substrate 102 is not the hard-coated variety.

When treated in this manner, light glare and the light reflections that reflect off the substrate 102 are not visible for an animal having tetra-chromatic vision or di-chromatic vision, and specifically from an incident angle from 0° to 60° from the point of view of the animal. Finally, a Step 218 includes integrating the substrate 102 into a device. This may include fitting the substrate 102 into a rifle sight, pair of binoculars, and lens-adaptable devices known in the art. The substrate 102 may also be stacked onto additional substrates, both with or without treatment.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method for treating a lens to reduce light reflections for animals and devices that view through the ultra violet light spectrum, the method comprising:
    providing a substrate, the substrate being defined by a front surface, a rear surface, and a circumferential edge;
    cleaning the surfaces of the substrate;
    etching the surfaces of the substrate;
    applying a primer solution to the surfaces of the substrate;
    applying an anti-reflective coating to at least one surface of the substrate, the anti-reflective coating including at least one of the following: an adhesion layer, a low index material, a high index material, and a superhydrophobic layer; and
    wherein the anti-reflective coating is applied in the following sequence:
        applying the adhesion layer;
        applying about 164.53 nm of the low index material;
        applying about 14.16 nm of the high index material;
        applying about 23.5 nm of the low index material;
        applying about 101 nm of the high index material;
        applying about 76.19 nm of the low index material; and
        applying the superhydrophobic layer.

2. The method of claim 1, further comprising integrating an invisible dye into the substrate, the dye absorbing a substantial amount of ultra violet light in the ultra violet light range.

3. The method of claim 1, further comprising integrating an invisible dye into the substrate, the dye absorbing at least 97 percent of ultra violet light in the ultra violet light range.

4. The method of claim 1, wherein the application of the anti-reflective coating further comprises applying the anti-reflective coating through vacuum coating.

5. The method of claim 4, wherein the vacuum coating comprises an electron beam gun evaporation technique or a magnetron sputtering technique.

6. The method of claim 1, wherein the low index material comprises $SiO_2$.

7. The method of claim 1, wherein the high index material comprises $ZrO_2$.

8. The method of claim 1, further comprising dipping the substrate into a primer solution, if the substrate is not hard-coated.

9. The method of claim 8, further comprising spinning the primer solution onto the substrate, if the substrate is not hard-coated.

10. The method of claim 1, further comprising etching, with an ultrasonic etching device, the surfaces of the substrate.

11. The method of claim 1, further comprising curing the substrate in an oven, if the substrate is not hard-coated.

12. The method of claim 1, further comprising plasma etching the surfaces of the substrate.

13. The method of claim 1, further comprising flipping the substrate to coat both surfaces in substantially the same manner.

14. The method of claim 1, further comprising integrating the substrate into a device.

15. The method of claim 1, wherein the lens includes at least one of the following: a trivex lens, a polycarbonate lens, a UV treated Cr-39 lens, and a UV treated glass lens.

16. A method for treating a lens to reduce light reflections for animals and devices that view through the ultra violet light spectrum, the method comprising:
providing a substrate, the substrate being defined by a front surface, a rear surface, and a circumferential edge;
integrating an invisible dye into the substrate, the dye absorbing at least 97 percent of ultra violet light in the ultra violet light range;
cleaning the surfaces of the substrate;
plasma etching, with an ultrasonic etching device, the surfaces of the substrate;
applying a primer solution to the surfaces of the substrate;
applying multiple coats of an anti-reflective coating to the surfaces of the substrate by vacuum coating, the anti-reflective coating including at least one of the following: an adhesion layer, a low index material comprising $SiO_2$, a high index material comprising $ZrO_2$, and a superhydrophobic layer, the anti-reflective coating being applied in the following sequence:
applying the adhesion layer;
applying about 164.53 nm of the low index material;
applying about 14.16 nm of the high index material;
applying about 23.5 nm of the low index material;
applying about 101 nm of the high index material;
applying about 76.19 nm of the low index material;
applying the superhydrophobic layer; and
inhibiting light glare and light reflections from the substrate for an animal having tetra-chromatic vision or di-chromatic vision, the inhibition of light glare and light reflections being at an incident angle from 0° to 60° when viewed by the animal.

* * * * *